United States Patent [19]

Caldwell

[11] 4,232,535
[45] Nov. 11, 1980

[54] SELF-ALIGNING-AXIAL SHAFTS-MAGNETIC COUPLING

[75] Inventor: Walter C. Caldwell, Irving, Tex.

[73] Assignee: Sun Oil Company (Delaware), Dallas, Tex.

[21] Appl. No.: 17,505

[22] Filed: Mar. 5, 1979

[51] Int. Cl.³ .......................... F16D 3/56; F16D 7/00
[52] U.S. Cl. ................................................. 64/28 M
[58] Field of Search .......................... 64/28 M, 14, 28; 73/134

[56] References Cited

U.S. PATENT DOCUMENTS

| | | | |
|---|---|---|---|
| 2,475,573 | 7/1949 | Smith et al. ........................... | 64/28 M |
| 2,642,740 | 6/1953 | Stephenson et al. ................ | 64/28 M |
| 2,684,210 | 7/1954 | Conti .................................... | 64/28 M |
| 2,929,477 | 3/1960 | Rodriguez et al. .................. | 64/28 M |

FOREIGN PATENT DOCUMENTS

| | | | |
|---|---|---|---|
| 1125232 | 3/1962 | Fed. Rep. of Germany .......... | 64/28 M |
| 835675 | 4/1952 | Netherlands ................................. | 64/14 |

*Primary Examiner*—Henry K. Artis
*Attorney, Agent, or Firm*—J. Edward Hess; Donald R. Johnson; James H. Phillips

[57] ABSTRACT

In order to provide a shaft coupling between two aligned shafts in which the absolute minimum of torque transferred across the coupling due to misalignment is desired, and to further provide for the capability of mutual axial movement between the two shafts, a unique magnetic coupling is employed. The input shaft terminates in a yoke structure with permanent bar magnets mounted on the yoke facing surfaces. Like poles of the two bar magnets are disposed facing one another. The output shaft terminates in a third bar magnet which is introduced into the space between the other two bar magnets oriented with its north and south poles disposed, respectively, between the facing north poles and the facing south poles of the magnet pair on the yoke. There is thus mutual magnetic repulsion between the centrally disposed bar magnet on the output shaft and each of the bar magnets on the input shaft. Hence, when the input shaft is turned, the output shaft follows trailing slightly in phase by an angle which is a function of the transmitted torque and the strength of the magnets. This coupling, in addition to the characteristics noted above, also has the ability to act as a filter of high frequency angular motion between the two shafts.

2 Claims, 10 Drawing Figures

U.S. Patent  Nov. 11, 1980  Sheet 1 of 2  4,232,535
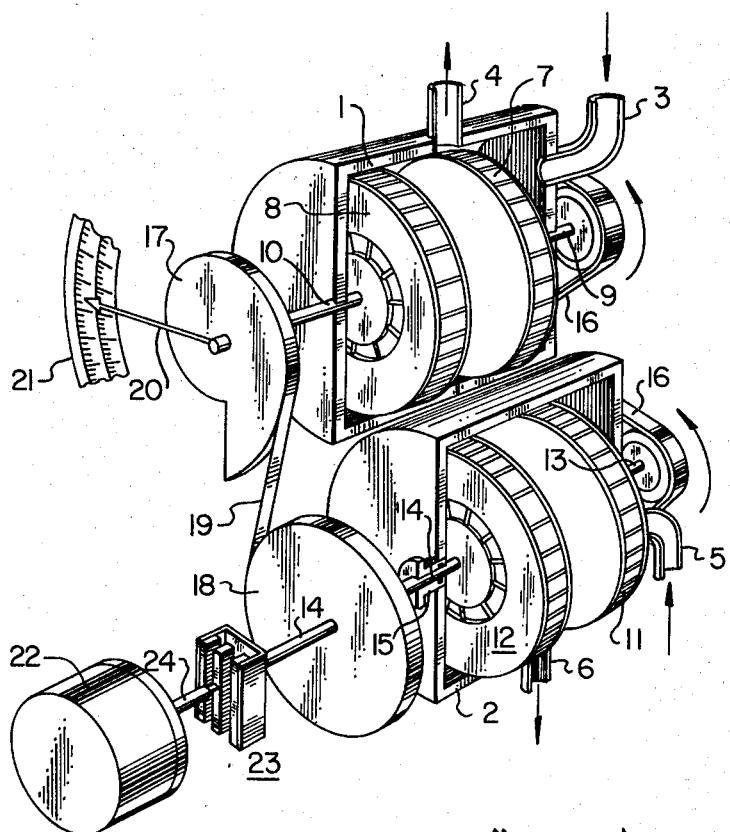
FIG. 1
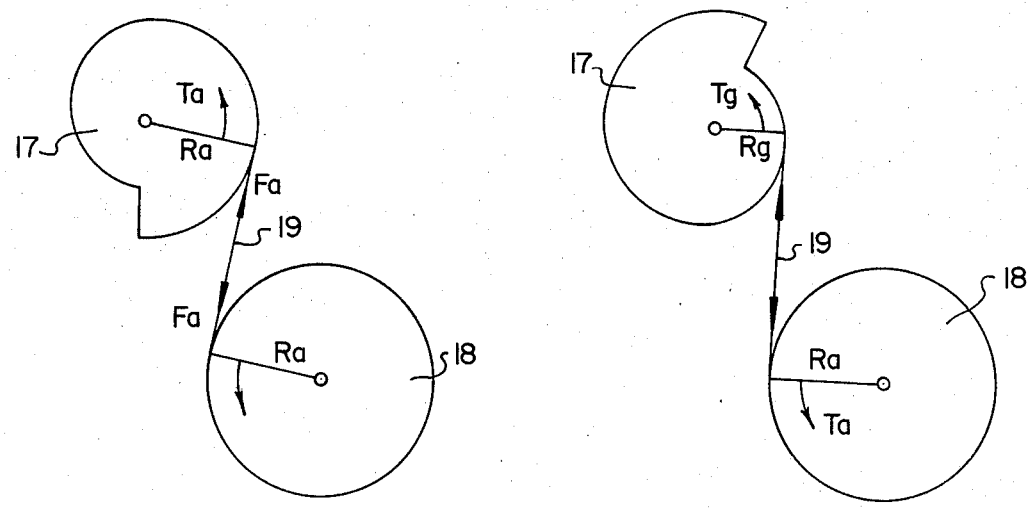
ZERO POSITION
READING POSITION
FIG. 2A
FIG. 2B

SELF-ALIGNING-AXIAL SHAFTS-MAGNETIC COUPLING

BACKGROUND OF THE INVENTION

This invention relates to the coupling arts and, more particularly, to an improved magnetic coupling adapted to transmit torque between axially-aligned shafts of delicate measuring instruments.

By way of a specific example of an environment in which the present invention finds use, an angular position transducer may be directly coupled to the mechanism of a Ranarex vane-type gravitometer to obtain an electrical readout of gas density without disturbing the accuracy of the basic instrument. In addition, the coupling of the present invention serves to filter out "jitter" which may appear on an input shaft, such as a shaft coupled to a densitometer apparatus, in order that a steadier output reading may be obtained from an angular position transducer driven by the coupling. In another aspect, the coupling of the present invention serves to accomodate limited angular and/or axial misalignment between the input and output shafts.

It is therefore a broad object of my invention to provide an improved magnetic coupling to link input and output shafts, each of which connect to relatively delicate instrumentation apparatus.

It is a more particular object of my invention to provide such a magnetic coupling which accomodates mutual axial displacement between the input and output shafts incident to adjustment of one of the instruments.

In another aspect, it is an object of my invention to provide such a magnetic coupling which also serves to filter relatively high frequency vibrations observed at the input shaft from appearing at the output shaft.

It is a still further object of my invention to provide a magnetic coupling with limited universal joint capability whereby axial and angular misalignment of the input and output shafts may be accomodated.

SUMMARY OF THE INVENTION

Briefly, these and other objects of the invention are achieved by employing an input shaft which terminates in a yoke structure with permanent bar magnets mounted on the yoke facing surfaces. Like poles of the two bar magnets are disposed facing one aother. The output shaft terminates in a third bar magnet which is introduced into the space between the other two bar magnets oriented with the north and south poles disposed, respectively, between the facing north and facing south poles of the bar magnet pair of the yoke. There is thus mutual magnetic repulsion between the centrally disposed bar magnet on the output shaft and each of the bar magnets of the input shaft. Hence, when the input shaft is turned, the output shaft follows trailing slightly in phase by an angle which is a function of the transmitting torque and the strength of the magnets. Thereby, the capability for mutual axial movement between the two shafts is achieved, and an absolute minimum of torque transferred across the coupling due to misalignment is obtained. Because of the non-linear stiffness of the magnetic coupling (i.e., the air gaps between the input and output magnets) the coupling acts as a filter of high frequency angular motion which may be present on the input shaft and is not desired on the output shaft.

DESCRIPTION OF THE DRAWING

The subject matter of the invention is particularly pointed out and distinctly claimed in the concluding portion of the specification. The invention, however, both as to organization and method of operation, may best be understood by reference to the following description taken in connection with the subjoined claims and the accompanying drawing, of which:

FIG. 1 is a pictoral representation of gas density measuring apparatus in which the invention may be beneficially employed;

FIG. 2 is a schematic diagram illustrating the operating principles of the gravitometer shown in FIG. 1;

FIG. 2A is a schematic diagram showing the position of the measuring wheels when checking the zero.

FIG. 2B is a schematic diagram showing the position of the measuring wheels when measuring specific gravity below 1.000.

DETAILED DESCRIPTION OF THE INVENTION

Figure 3:
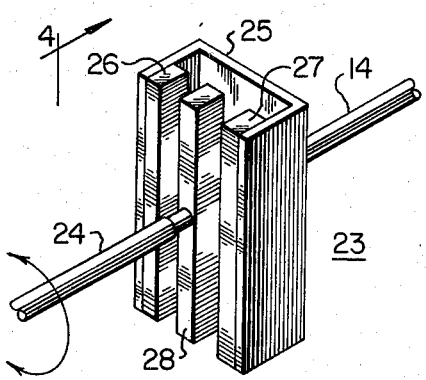
FIG. 3 is a fragmentary view illustrating particularly the magnetic coupling of the present invention.

Referring now to FIG. 1, a cutaway representing of a vane-type gravitometer, such as that manufactured by the Sybron Corporation of Paramus, New Jersey under the trademark, "Ranarex", is presented. The vane-type gravitometer uses dynamic forces to measure the specific gravity of gas. The operating principle is illustrated in FIG. 1. The chassis of the instrument forms first 1 and second 2 cylindrical gas-type measuring chambers. Chamber 1 has a gas inlet port 3, and a gas exhaust port 4; similarly, the chamber 2 has a gas inlet port 5, and a gas exhaust port 6. The chamber 1 contains an impeller 7, and an impulse wheel 8, each of which has straight radial vanes. These wheels are mounted on separate shafts, facing each other but not touching, so that the assembly resembles an automotive fluid coupling. The chamber 2 contains like elements including an impeller 11 mounted on a shaft 13 and an impulse wheel 12 mounted on a shaft 14. The shaft 14 passes through a threaded bushing 15 whose function will be explained below. An electric motor (not shown) and drive belt 16 rotate both impellers 7, 11 at the same speed and in the same direction.

The impellers 7 and 11 draw continuous flows of gas sample and dry reference air into their respective chambers 1 and 2 and send the gas and air against the vanes of the corresponding impulse wheels 8 and 12. As the spinning gas and air impinge against these vanes, they create torques on the impulse wheels 8 and 12 which are proportional to the densities of the gas and of the reference air. These torques are transmitted from the chambers 1 and 2 by the impulse wheels 8, 12, pivot shafts 10, 14 to two external measuring wheels 17 and 18. The upper measuring wheel 17 has a spiral shaped rim (cam), and the lower measuring wheel 18 has a circular rim. A flexible tape 19 is wrapped over the measuring wheel rims in the crossed direction so that the gas and air torques exert two opposing forces on the tape. These opposing forces prevent continuous rotation of the measuring wheels but permit controlled motion of the system as the gas torque changes. As the system moves, a pointer 20 attached to the upper or cam wheel 17 moves over an indicating scale 21 which is graduated to read specific gravity. Only a small arc of the indicating scale 21 is shown, and in practice, this scale typically extends for 270°.

FIGS. 2A and 2B explain the geometry of the measuring system for two operating conditions. FIG. 2A shows the position of the cam shaped measuring wheel 17 and the reference circular measuring wheel 18 when checking the "zero." This check is made each time the gravitometer is started by operating with dry air passing through both the chambers 1 and 2. The torques produced by the air in the two chambers will be equal and the measuring wheels 17, 18 will therefore move until the opposing forces $F_a$ are equal. The radii (moment arms) much be equal to produce equal forces from equal torques. The angular position in which the cam radius on the measuring wheel 17 equals the radius of the circular reference wheel 18 corresponds to the 1.000 graduation on the indicating scale.

Referring to FIG. 2B in conjunction with FIG. 1, the position of the system is shown when measuring specific gravity below 1.000. Gas is admitted to the upper chamber 1, and dry reference air to the lower chamber 2. The lighter gas creates a lower torque in the upper chamber 1 than the torque created by the air in the lower chamber 2. Temporarily, the upward force $F_g$ created by the cam measuring wheel 17 will be smaller than the downward force $F_a$ created by the circular reference wheel 18. The circular reference wheel 18 and the tape 19 will then pull the cam reference wheel 17 clockwise toward the balanced position shown. As the cam wheel 17 rotates, the radius $R_g$ gradually decreases, such that the resulting upward force $F_g$ gradually increases and eventually is restored to its original value at which $F_g$ becomes equal to $F_a$ and motion will cease. Meanwhile, the cam wheel 17 has turned the pointer 20 to a new angular position on the scale 21. The observer then simply reads the specific gravity directly from the scale 21.

It is evident from this example that the radius of the cam wheel 17, not the force it exerts, changes as the gas density varies. In effect, the measuring system divides the radius of the cam wheel 17 by the radius of the circular wheel 18. This is the equivalent of dividing the torque and density of the gas in the upper chamber by the torque and density of the reference air in the lower chamber 2 to obtain the specific gravity.

To measure specific gravity 1.000, the gas is admitted to the upper chamber 1. The measuring system then divides the torque and density of the reference air in the upper chamber 1 by the torque and density of the gas in the lower chamber 2. This is the reciprocal of the specific gravity. The measuring system and pointer 20 will reach a balance position as they did with the gas below 1.000. However, a different scale on the indicator 21 must be read, i.e., a scale which is the reciprocal of that previously referred to.

It will be understood that the pressures and temperatures of the test gas and reference air are equalized and that the drive belt 16 turns the impellers 7 and 11 at equal speeds. Therefore, changes in pressure, temperature and motor speed affect both torques equally. Since the torques produce opposing forces, the effects of equally varying pressure, temperature and motor speed are cancelled.

Thus, it will be understood the visual indication of the pointer 20 on the indicator scale 21 provides a local, visual readout of gas density. However, it may be desirable to provide an electrical indication of density for remote readout or for obtaining an input signal to another instrument or to a recording device. As shown in FIG. 1, this function may be achieved by an angular position transducer 22 having a shaft 24 connected to an extension of the shaft 14 by a flexible coupling 23. It may be noted that the angular position transducer 22 could also be connected to an extension of that shaft 10; the connection to the shaft 14 is favored on the particular gravitometer employed as exemplary simply because of the physical layout of the mechanism.

The angular position transducer 22 may be a rotary variable differential transformer such as Model R30A manufactured by Schaviets Engineering of Pennsauken, New Jersey. In operation, a-c voltage is applied to one winding of the angular position transducer, and it produces an a-c voltage in a secondary (output) coil, which output voltage is directly related to the shaft position. The angular position transducer 22, like the gravitometer mechanism itself, is quite delicate such that the coupling 23 between the two must contribute an absolute minimum of torque in the system due to misalignment of the two coupled shafts.

In addition, because of an adjustment inherent in the gravitometer mechanism, it is necessary that the two shafts 14, 24 be allowed to move axially with respect to each other. This adjustment is carried out by turning the threaded bushing 15 (by any suitable means, not shown) to slightly change the viscous coupling between the impeller 11 and impulse wheel 12. This is the "zero" adjustment previously referred to and is carried out with dry air flowing through both chambers 1 and 2 by turning the threaded bushing 15 to adjust the coupling of the mechanism in the lower chamber 2 until a 1.000 reading is obtained. Manifestly, this adjustment alters the axial positon of the shaft 14 which is constrained within the threaded bushing 15.

Figure 4:
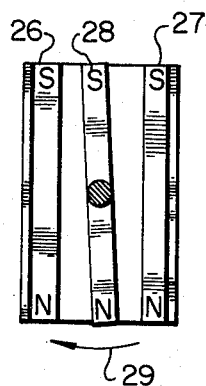
FIG. 4 is a view taking along lines 4, 4 of FIG. 3 illustrating the angular displacement between the input and output magnets during angular translation of the coupling.

The details of the coupling 23 are shown in FIG. 3. The input shaft 14 terminates in a yoke structure 25 with permanent bar magnets 26 and 27 mounted on the yoke facing surfaces. Like poles of the two bar magnets 26 and 27 are disposed facing one another. The output shaft 24 terminates in a third bar magnet 27 which is disposed in the space between the other two bar magnets 26, 27 and is oriented with its north and south poles, respectively, between the facing north poles and the facing south poles of the magnet pair on the yoke structure 25. There is thus the usual magnetic repulsion between the centrally disposed bar magnet 28 on the output shaft 24 and each of the bar magnets 26, 27 on the yoke structure 25. Hence, as best shown in FIG. 4, when the input shaft is turned, the bar magnets 26, 27 turn, for example in the direction indicated by the arrow 29, and the bar magnet 28 (and hence the output shaft 24) follows, trailing slightly in phase by an angle which is a function of the transmitted torque, the inertia of the system connected to the output shaft 24, and the strength and spacing of the magnets. In actual practice, it will be understood that the lag angle illustrated in FIG. 4 is greatly exaggerated when the coupling is employed in the exemplary system since the torque necessary to turn the angular position transducer 22 is very small. Additionally, it will be understood that, when there is no angular translation of the input shaft 14 taking place, the quiescent position of the bar magnet 28 is in the balanced position shown in FIG. 3.

Figure 5:
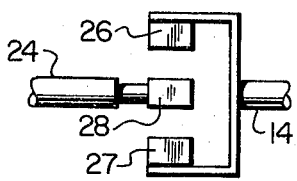
FIG. 5 illustrates the orientation of the bar magnets when the input and output shafts are axially positioned with respect to one another at a nominal mid-point.
Figure 6:
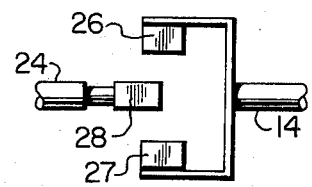
FIG. 6 is a view similar to FIG. 5, but illustrates the relative positions of the bar magnets when the input and output shafts have moved axially apart.
Figure 7:
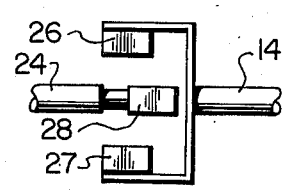
FIG. 7 is a view similar to FIGS. 5 and 6, but illustrating the disposition of the bar magnets when the input and output shafts have moved toward one another from their nominal mid-point positions.

Since, as previously noted, it is necessary from time to time to zero the gravitometer by turning the threaded bushing 15 which results in axial displacement of the input shaft 14, the coupling 23 must be able to accomodate axial adjustment. Thus, as shown in FIG. 5, a nominal mid position of the input shaft 14 results in substantial alignment of the bar magnets 26, 27, 28. If, however, it is necessary to turn the threaded bushing 15 in to adjust the gravitometer zero, the yoke structure 25, and hence the bar magnets 26, 27 are withdrawn from the bar magnet 28 as shown in FIG. 6. Conversely, if it becomes necessary to adjust the threaded bushing in the opposite direction to zero the gravitometer, the yoke structure, and hence the bar magnets 26, 27 move toward and overlap the bar magnet 28 as shown in FIG. 7. It has been found that non-alignment of fifty percent of the width of the bar magnets 26, 27, 28 is readily accomodated and, in practice, are far beyond the adjustments needed to zero the gravitometer. However, if use of the coupling in other environments necessitates the accomodation of a more substantial axial mutual translation, the widths of the bar magnets 26, 27, 28 may be increased accordingly to achieve reliable operation.

Figure 8:
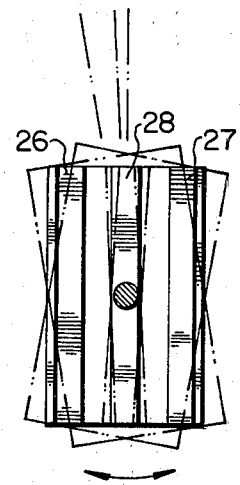
FIG. 8 is a view similar to FIG. 4, but illustrates the mechanical filter effect obtained by the magnetic coupling when the input shaft carries high frequency oscillations.

Although not a necessary attribute when the coupling of the present invention is employed with the gravitometer and angular position transducer apparatus illustrated, the coupling has the ability to filter out high-frequency "jitter" or angular vibrations which appear on the input shaft from being reflected at the output shaft. Thus, as shown in FIG. 8, if the input shaft, and hence the bar magnets 26 and 27, are vibrating through a given arc, the bar magnet 28, and hence the output shaft, describe only a very small following arc. This characteristic, which is partly a function of the inertia of the output system, but particularly relies on the non-liner stiffness of the magnetic coupling, is particularly useful when a device such as the angular position transducer is driven since the resulting output signal is correspondingly steadier.

Figure 9:
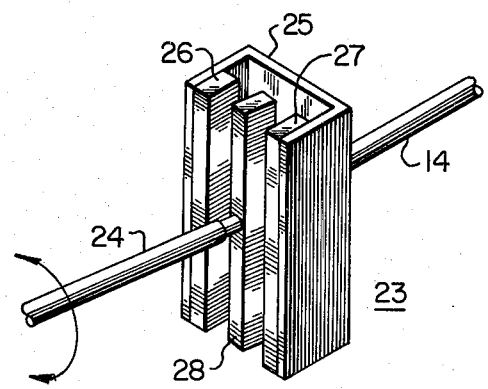
FIG. 9 is an illustration similar to FIG. 3 and illustrates the manner in which the magnetic coupling can accomodate limited angular and/or axial misalignment between the input and output shaft.

It is clear from the foregoing that the coupler 23 can readily accomodate modest amounts of axial misalignment when the axes of the coupled shafts are parallel. In addition, as illustrated in FIG. 9, some angular misalignment can be accomodated by the coupling 23 much in the manner of a universal joint. It should be noted, however, that a "detenting" effect is observed in which two positions, 180° apart, are slightly favored when such angular misalignment exists. For slight angles, the effect is negligible, but, for some applications, the detenting effect may be unacceptable beyond certain angles.

While the principles of the invention have now been made clear in an illustrative embodiment, there will immediately be obvious to those skilled in the art, many modifications of structure, arrangements, proportions, the elements, materials, and components used in the practice of the invention which are particularly adapted for specific environments and operating requirements without departing from those principles.

What is claimed is:
1. A mechanism for flexibly coupling first and second substantially axially aligned shafts comprising:
  (A) a yoke structure connected to one end of the first shaft, said yoke structure having inwardly facing first and second opposing surfaces disposed generally parallel to the axis of the first shaft;
  (B) first and second bar magnets affixed, respectively, on said first and second facing surfaces with a space therebetween, said first and second bar magnets being oriented with like poles thereof facing one another across said space;
  (C) a third bar magnet connected to one end of the second shaft, said third bar magnet being disposed in said space between said first and second bar magnets and oriented with the north and south poles thereof situated, respectively, between the facing north poles and the facing south poles of said first and second bar magnets; and
  (D) first and second means for rotatably supporting, respectively, the first and second shafts.
2. The magnetic coupling mechanism of claim 1 in which at least one of said support means is adapted to accomodate axial translation of the shaft supported thereby whereby said coupling mechanism achieves the ability to transmit torque between the shafts throughout a range of mutual axial positions between the coupled shafts.

* * * * *